United States Patent [19]
Viard

[11] Patent Number: 6,094,924
[45] Date of Patent: Aug. 1, 2000

[54] METHOD FOR CONTROLLING THE GAS EXTRACTION RATE FROM A CRYOGENIC APPARATUS AND APPARATUS THEREFOR

[75] Inventor: Nicolas Viard, Buc, France

[73] Assignee: L'Air Liquide, Societe Anonyme pour l'Etude de l'Exploitation des Procedes Georges Claude, Paris, France

[21] Appl. No.: 09/147,766
[22] PCT Filed: Jun. 8, 1998
[86] PCT No.: PCT/FR98/01163
§ 371 Date: Mar. 3, 1999
§ 102(e) Date: Mar. 3, 1999
[87] PCT Pub. No.: WO99/01705
PCT Pub. Date: Jan. 14, 1999

[30] Foreign Application Priority Data

Jul. 3, 1997 [FR] France ................................. 97 08414

[51] Int. Cl.$^7$ ................................................ F25D 13/06
[52] U.S. Cl. .................................. 62/63; 62/186; 62/374
[58] Field of Search .................... 62/63, 186, 374, 62/380

[56] References Cited

U.S. PATENT DOCUMENTS

| | | | |
|---|---|---|---|
| 4,276,753 | 7/1981 | Sandberg et al. | 62/186 |
| 4,627,244 | 12/1986 | Willhoft | 62/63 |
| 4,800,728 | 1/1989 | Klee | 62/186 |
| 4,833,892 | 5/1989 | Wassibauer et al. | 62/78 |
| 4,947,654 | 8/1990 | Sink et al. | 62/186 |
| 5,606,049 | 2/1997 | Moore et al. | 62/63 |

FOREIGN PATENT DOCUMENTS

| | | |
|---|---|---|
| 583692 | 2/1994 | European Pat. Off. . |
| 667503 | 2/1995 | European Pat. Off. . |
| 1076584 | 2/1965 | United Kingdom . |

*Primary Examiner*—Ronald Capossela
*Attorney, Agent, or Firm*—Nixon Peabody LLP; Robert M. Schulman

[57] ABSTRACT

Process for controlling the rate of gas extraction of a gas extractor for an enclosure of a cryogenic apparatus comprising a cryogenic fluid feed and an internal atmosphere, the apparatus being in contact with an ambient medium, comprising the steps of:

measuring the content ($m_{O2}$) of the internal atmosphere of the enclosure in terms of a gas of the ambient medium;

defining a target content ($u_{O2}$) for the measured content;

calculating the rate of gas extraction ($r_c$) of the extractor as a function of the measured content ($m_{O2}$) so as to maintain this content substantially equal to the target content ($u_{O2}$); and operating the extractor on the basis of the calculated rate of gas extraction ($r_c$).

18 Claims, 2 Drawing Sheets

METHOD FOR CONTROLLING THE GAS EXTRACTION RATE FROM A CRYOGENIC APPARATUS AND APPARATUS THEREFOR

BACKGROUND OF THE INVENTION

1. Field of the Invention

The present invention relates to a process for controlling the extraction rating of a gas extractor for an enclosure of a cryogenic apparatus furnished with a cryogenic fluid feed, said apparatus being in contact with the ambient medium.

The invention furthermore relates to a cryogenic apparatus implementing such a control process.

2. Description of Related Art

The invention is concerned in particular with deep-freezing tunnels comprising liquid nitrogen feed means and means for extracting the vaporized nitrogen which are formed by a chimney fitted with an extraction fan.

Such a tunnel comprises openings for loading and extracting articles for freezing and which have been frozen. Gaseous exchanges between the ambient medium and the atmosphere prevailing in the enclosure of the tunnel take place through these openings.

In the case in which the extraction flow rate is too high, hot and moist air enters the enclosure of the tunnel. Numerous drawbacks arise from this. In particular, as a result of the air being at a temperature greater than the temperature prevailing in the enclosure, there is excessive consumption of cryogenic fluid so as to maintain the temperature in the enclosure constant. Moreover, in the air being laden with moisture, there is formation of ice and frost on cooling the air both in the enclosure of the tunnel and also in the extraction chimney.

Conversely, if the extraction flow rate is too low, the cryogenic fluid is not completely discharged via the chimney and spills out of the enclosure of the tunnel, thus modifying the composition of the ambient medium. Thus, current cryogenic tunnels cannot be used in enclosed spaces on account of the risks of creating an under-oxygenated atmosphere of danger to staff.

Currently, the extraction rate is adjusted manually. In practice, the individual in charge of this adjustment assesses visually the direction of the gas flow set up between the enclosure of the tunnel and the ambient medium. They attempt to zero this flow by altering the extraction flow rate. However, it is observed that, in practice, so as not to risk an under-oxygenated atmosphere, the adjustment is made in such a way that the ambient air enters the interior of the cryogenic tunnel continuously. The problems set forth above then adversely affect the proper operation of the apparatus.

SUMMARY AND OBJECTS OF THE INVENTION

The purpose of the invention is to afford a simple solution to the abovementioned problem resulting from poor control of the gas flows between the exterior and the interior of the enclosure of a cryogenic apparatus.

To this end, the subject of the invention is a process for controlling the extraction rating of a gas extractor for an enclosure of a cryogenic apparatus furnished with a cryogenic fluid feed, said apparatus being in contact with the ambient medium, characterized in that it comprises the steps consisting:

in measuring the content of the atmosphere of the enclosure in terms of a gas of the ambient medium;

in defining a target content for said measured content;

in calculating the extraction rating of the extractor as a function of said measured content so as to maintain this content substantially equal to said target content; and in operating said extractor on the basis of said calculated extraction rating.

According to particular modes of implementation, the process can comprise one or more of the following characteristics:

it furthermore comprises the steps consisting:

in determining a value representative of the quantity of cryogenic fluid introduced into the enclosure; and in calculating the extraction rating as a function, on the one hand, of the value representative of the measured quantity of cryogenic fluid and, on the other hand, of said measured content and of said target content;

the step of calculating the extraction rating comprises the successive steps consisting:

in firstly calculating a theoretical extraction rating of said extractor as a function of said value representative of the quantity of cryogenic fluid introduced into the enclosure;

then in correcting via a regulating loop said theoretical extraction rating calculated as a function of said measured content and of said target content;

it comprises the steps consisting:

in measuring the temperature of the gas in the enclosure upstream of the extractor;

in calculating a representative value of the quantity of gas to be extracted from the enclosure on the basis of the measured temperature and of the value representative of the quantity of cryogenic fluid introduced into the enclosure; and in calculating said theoretical extraction rating as a function of said representative value of the quantity of gas to be extracted;

the enclosure of the cryogenic apparatus is substantially at the pressure of the ambient medium, and the process comprises the steps consisting:

in measuring the pressure of the gas upstream of said cryogenic fluid feed;

in calculating a representative value of the quantity of gas to be extracted from the enclosure on the basis of the measured pressure and of the value representative of the quantity of cryogenic fluid introduced into the enclosure; and in calculating said theoretical extraction rating as a function of said representative value of the quantity of gas to be extracted;

it comprises the steps consisting:

in measuring the temperature of the gas upstream of said cryogenic fluid feed;

in calculating a representative value of the quantity of gas to be extracted from the enclosure on the basis of the measured temperature and of the value representative of the quantity of cryogenic fluid introduced into the enclosure; and in calculating said theoretical extraction rating as a function of said representative value of the quantity of gas to be extracted;

the cryogenic fluid is introduced into the apparatus through at least one valve and in that said value representative of the quantity of cryogenic fluid is the degree of opening of the valve;

the ambient medium is atmospheric air and in that said gas whose content is measured is oxygen; and the extraction rating is calculated by a regulator comprising automatic means for optimizing the regulating parameters and it comprises the steps consisting:

in calculating and storing at various instants of a time period the absolute value of the deviation between the measured content and the target content;

in calculating the mean of said absolute values of the deviations over said time period;

in comparing said mean with a predetermined threshold value; and in triggering automatic optimization of the regulating parameters if said mean is greater than said predetermined threshold value.

The invention furthermore relates to a cryogenic apparatus comprising a working enclosure open to the ambient medium, a gas extractor with variable extraction rating and a cryogenic fluid feed for the enclosure, characterized in that it comprises:

means for measuring the content of the atmosphere of the enclosure in terms of a gas of the ambient medium;

means for defining a target content for said measured content;

means for calculating the extraction rating of the extractor as a function of said measured content so as to maintain this content substantially equal to said target content; and means for operating said extractor on the basis of said calculated extraction rating.

According to particular embodiments, the apparatus can comprise one or more of the following characteristics:

it furthermore comprises:

means for determining a value representative or the quantity of cryogenic fluid introduced into the enclosure; and means for calculating the extraction rating as a function, on the one hand, of the value representative of the measured quantity of cryogenic fluid and, on the other hand, of said measured content and of said target content;

said means for calculating the extraction rating comprise:

means for firstly calculating a theoretical extraction rating of said extractor as a function of said value representative of the quantity of cryogenic fluid introduced into the enclosure;

means for then correcting via a regulating loop said theoretical extraction rating calculated as a function of said measured content and of said target content;

it comprises:

means for measuring the temperature of the gas in the enclosure upstream of the extractor;

means for calculating a representative value of the quantity of gas to be extracted from the enclosure on the basis of the measured temperature and of the value representative of the quantity of cryogenic fluid introduced into the enclosure; and means for calculating said theoretical extraction rating as a function of said representative value of the quantity of gas to be extracted;

the enclosure of the cryogenic apparatus is substantially at the pressure of the ambient medium, and the apparatus comprises:

means for measuring the pressure of the gas upstream of said cryogenic fluid feed;

means for calculating a representative value of the quantity of gas to be extracted from the enclosure on the basis of the measured pressure and of the value representative of the quantity of cryogenic fluid introduced into the enclosure; and means for calculating said theoretical extraction rating as a function of said representative value of the quantity of gas to be extracted;

it comprises:

means for measuring the temperature of the gas upstream of said cryogenic fluid feed;

means for calculating a representative value of the quantity of gas to be extracted from the enclosure on the basis of the measured temperature and of the value representative of the quantity of cryogenic fluid introduced into the enclosure; and means for calculating said theoretical extraction rating as a function of said representative value of the quantity of gas to be extracted;

it comprises a valve for introducing cryogenic fluid into the apparatus and in that said value representative of the quantity of cryogenic fluid is the degree of opening of the valve;

the ambient medium is atmospheric air and said gas whose content is measured is oxygen; and it comprises a regulator for calculating the extraction rating, which regulator comprises automatic means for optimizing the regulating parameters and it comprises:

means for calculating and storing at various instants of a time period the absolute value of the deviation between the measured content and the target content;

means for calculating the mean of said absolute values of the deviations over said time period;

means for comparing said mean with a predetermined threshold value; and means for triggering automatic optimization of the regulating parameters if said mean is greater than said predetermined threshold value.

The invention will be better understood on reading the description which follows, offered merely by way of example and given whilst referring to the drawings.

DETAILED DESCRIPTION OF PREFERRED EMBODIMENTS

Figure 1:
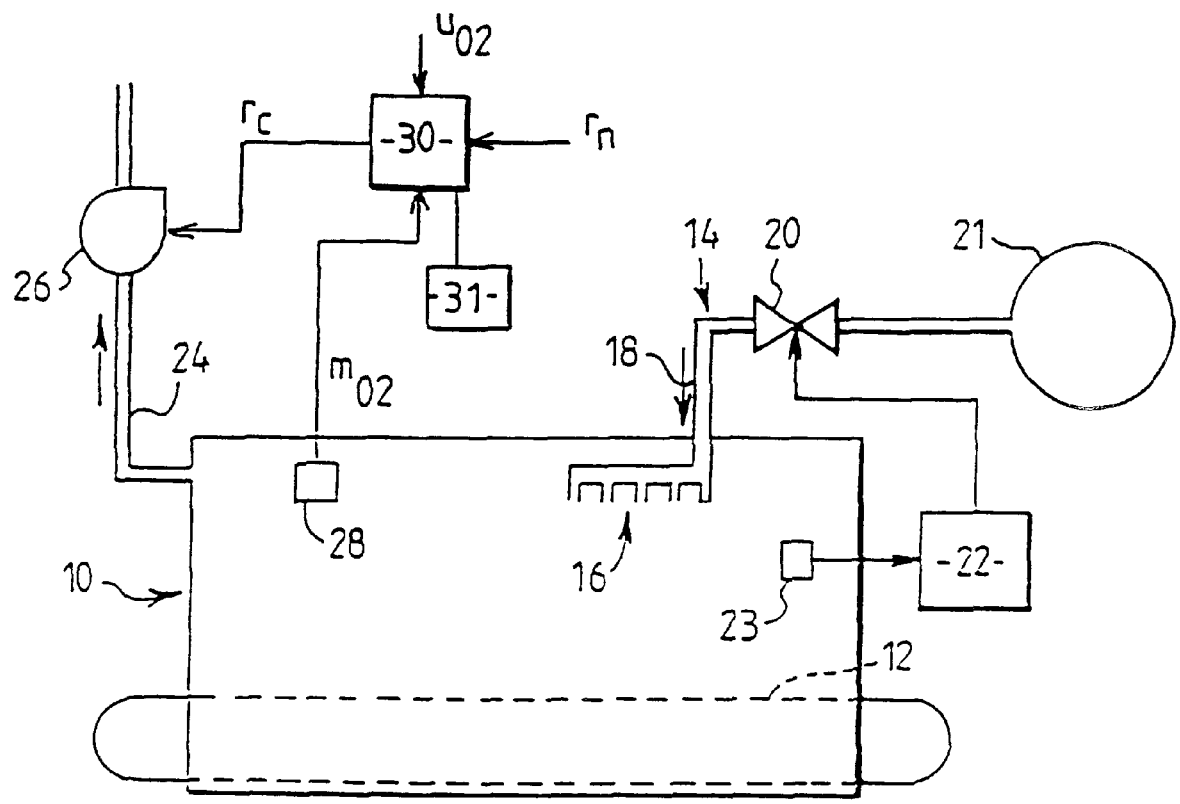
FIG. 1 is a diagrammatic view of a cryogenic apparatus implementing a control process according to the invention.

In FIG. 1, the cryogenic apparatus is, for example, a cryogenic tunnel 10 adapted for the deep-freezing of foodstuff articles. A conveyor 12, intended for introducing and extracting the articles, passes right through the tunnel.

The cryogenic tunnel 10 comprises means 14 for feeding a liquid cryogenic fluid, liquid nitrogen for example. These means comprise several injection nozzles 16 fed from a cryogenic fluid feed pipe 18. A regulating valve 20 is provided on the pipe 18 and is adapted for adjusting the flow rate of nitrogen introduced into the enclosure of the tunnel. The liquid nitrogen is stored in a container 21 to which the pipe 18 is connected.

The regulating valve 20 is controlled in respect of its opening by an operating unit 22 connected to a temperature sensor 23 placed in the enclosure of the tunnel. The operating unit 22 is adapted to maintain a substantially constant temperature inside the enclosure of the tunnel and forms a temperature regulating loop which alters the opening $\alpha$ of the valve 20.

A chimney 24 caters for the discharging of the vaporized cryogenic fluid into the enclosure of the tunnel 10. This chimney is connected to the interior of the enclosure of the tunnel. It comprises a fan 26 intended for extracting the gases from the enclosure. The fan 26 has a variable rating, so that it is possible to control the rate of extraction from the chimney electrically.

To this end, the characteristic extraction curve of the fan is known, this giving the flow rate of gas extracted as a function of the frequency of rotation of the fan. This curve is generally a parabola.

According to the invention, the tunnel comprises a sensor 28 arranged in the enclosure of the tunnel and adapted for measuring the content $M_{O2}$ of the atmosphere in the enclosure in terms of a gas of the ambient medium and especially in terms of oxygen. The sensor 28 is connected to an operating unit 30 forming a regulator and adapted for controlling the fan 26. In particular, the operating unit 30 is adapted for calculating an extraction rating $r_c$ for the fan 26 and for generating a control signal so that the fan operates at a frequency of rotation corresponding to the desired extraction rating $r_c$.

To this end, the operating unit 30 comprises means for inputting a nominal extraction rating $r_n$ fixed by the user. On the basis of this nominal rating and of the characteristic extraction curve of the fan, the operating unit 30 determines the control signal corresponding to the rating $r_c$ to be applied to the fan. The unit 30 furthermore comprises means for inputting an oxygen target content denoted $u_{O2}$. This content is, for example, fixed at 0.5% of the atmosphere in the enclosure.

According to the invention, the operating unit 30 calculates the extraction rating $r_c$ used for the control of the fan 26 in such a way that the oxygen content $M_{O2}$ in the enclosure, measured by the sensor 28, remains substantially constant and equal to the target content, denoted $u_{O2}$.

Advantageously, the operating unit 30 comprises a PID regulator (proportional integral derivative regulator) furnished with automatic means for calculating and optimizing the parameters of the regulator. Since this type of regulator is known, it will not be described in greater detail.

The regulator 30 is associated with means 31 for determining the instant of triggering of the means for calculating and optimizing the parameters of the regulator.

These means 31 comprise means for storing at a predetermined frequency both the target content $u_02$ and the content actually measured $M_{O2}$ in the enclosure of the tunnel.

Furthermore, the triggering means 31 comprise calculating means adapted for determining the mean over time γ of the absolute value of the deviations between the target content $u_{O2}$ and the content actually measured $M_{O2}$. This mean is expressed in the form:

$$\gamma = \Sigma_i |m_{O2} - u_{O2}|i/\Delta t$$

in which:

$\Delta t$ is the measurement interval and i is the number of measurements performed during the time interval $\Delta t$.

The triggering means 31 are adapted for, when the mean of the deviations γ exceeds a predetermined threshold $\gamma_0$, automatically triggering the means for optimizing the regulator.

Thus, if the regulator with its initial parameter settings cannot maintain the oxygen content $M_{O2}$ close to the target value $u_{O2}$, the parameters of the regulator are automatically recalculated, without an operator having to be involved.

The triggering means 31 can be built into the operating unit 30 or be located distantly at a remote site connected to the operating unit 30 by a telephone link.

It is appreciated that with such an installation, if ambient air enters the interior of the enclosure of the tunnel to an excessive extent, the oxygen content $M_{O2}$ of the atmosphere of the enclosure will increase so that the operating unit 30 will reduce the rating $r_c$ of the extractor so that the ambient air is no longer sucked into the enclosure of the tunnel.

Conversely, if the oxygen content $M_{O2}$ of the atmosphere in the enclosure of the tunnel is less than the target content $u_{O2}$, then the rating $r_c$ of the fan 26 is increased by the operating unit 30 so that the vaporized cryogenic fluid does not escape out of the tunnel.

Thus, the gas flows between the interior of the enclosure of the tunnel and the exterior are very low, so that the apparatus does not have the previously mentioned drawbacks. In particular, such an apparatus can be used in an enclosed space without any risk of creating an under-oxygenated atmosphere which may adversely affect the health of staff.

Figure 2:
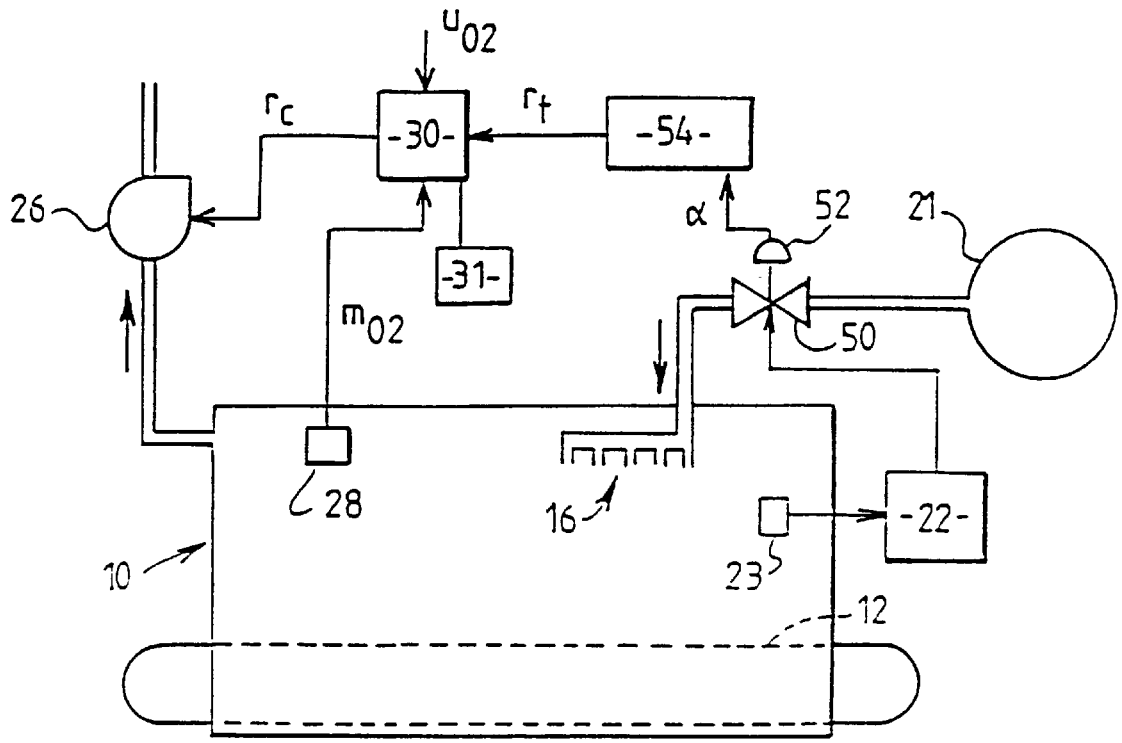
FIGS. 2 and 3 are diagrammatic views of variant embodiments of the apparatus of FIG. 1.

Represented in FIG. 2 is a more sophisticated embodiment of the tunnel of FIG. 1. In this figure, the analogous elements are designated by the same references as in FIG. 1.

In this variant, the solenoid valve 20 is replaced by a regulating valve 50 associated with a sensor 52 adapted for determining the degree of opening of the valve. This degree of opening is denoted α and corresponds to the angle of opening of the shutter of the valve in the case of a butterfly valve.

The sensor 52 is connected to an information processing unit 54 comprising a computer and means for storing a characteristic curve of the opening of the valve giving, as a function of its degree of opening α, the flow rate of cryogenic fluid introduced into the enclosure of the tunnel. This characteristic curve is supplied by the valve manufacturer and is generally a straight line.

The processing unit 54 comprises means for calculating a theoretical extraction rating denoted $r_t$ for the fan 26. The theoretical extraction rating $r_t$ is, in particular, calculated on the basis of a value representative of the quantity of cryogenic fluid introduced into the enclosure of the tunnel, this representative value being determined on the basis of the degree of opening α of the valve and of the characteristic curve stored. The processing unit 54 is connected to the operating unit 30 so as to supply the calculated value $r_t$ of the theoretical rating with a view to the control of the fan 26.

Thus, it is understood that in the apparatus described in FIG. 2, the extraction rating $r_c$ is determined as a function of the quantity of cryogenic fluid introduced into the enclosure of the tunnel and cascade regulation is performed as a function of the oxygen content measured in the enclosure of the tunnel.

Figure 3:
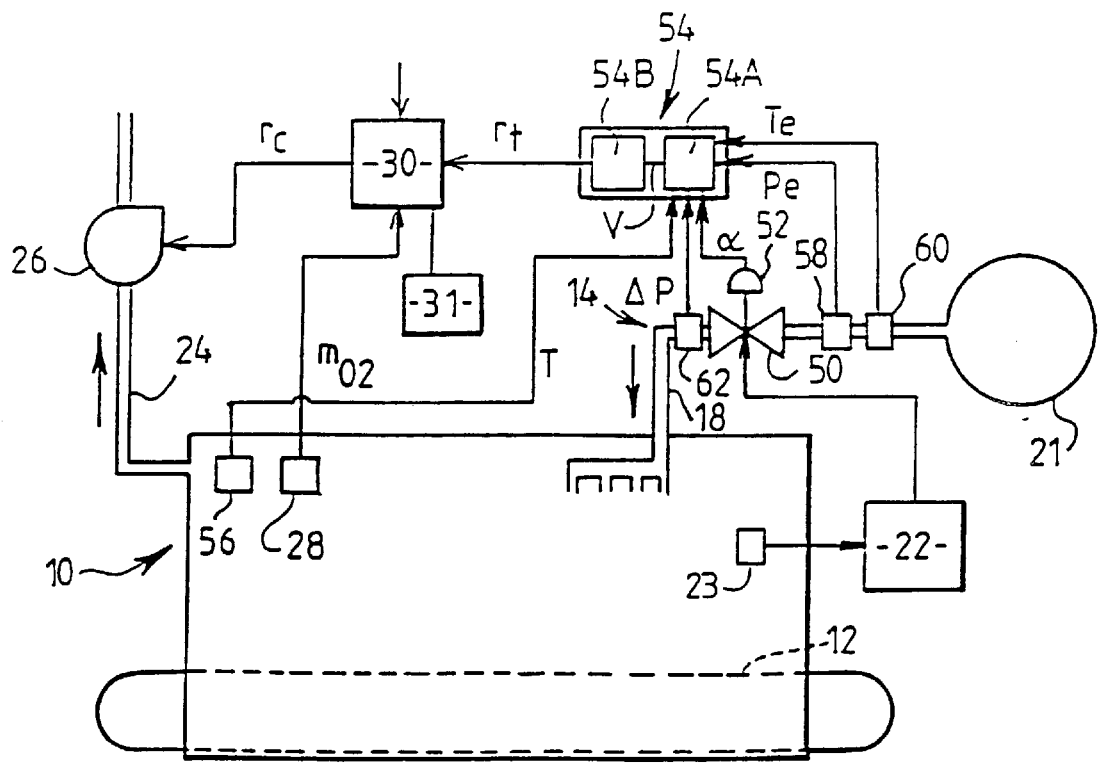

FIG. 3 represents a further enhancement to the tunnel represented in FIG. 2.

In this figure, the elements analogous to those of FIG. 2 are designated by identical references.

In the embodiment of FIG. 3, the tunnel furthermore comprises a temperature sensor 56 arranged in the enclosure of the tunnel and adapted to determine the temperature T of the vaporized gas immediately upstream of the chimney 24. The temperature sensor 56 is connected to the processing unit 54.

Furthermore, a pressure sensor 58 and a temperature sensor 60 are mounted upstream of the regulating valve 50 on the pipe 18. These sensors respectively determine the pressure Pe and the temperature Te upstream of the valve. They are both connected to the processing unit 54.

Finally, a differential pressure sensor 62 adapted to determine the loss of head ΔP due to the regulating valve 50 is mounted on either side of this valve on the pipe 18. It is connected to the unit 54.

In this variant embodiment, the processing unit 54 comprises means 54A of calculating a representative value V of the quantity of vaporized gas to be extracted from the enclosure on the basis of the temperature T in the enclosure measured by the sensor 56, of the pressure Pe measured by the sensor 58, of the temperature Te measured by the sensor 60, of the degree of opening α of the valve 50 and of the loss of head ΔP related to the valve 50 and the pipe 18.

By knowing the temperature T in the enclosure of the tunnel, immediately upstream of the exit, the pressure Pe and temperature Te of the cryogenic fluid upstream of the regulating valve 50 as well as the loss of head ΔP, it is possible to determine with accuracy the actual quantity of gas to be extracted from the tunnel.

The processing unit 54 moreover comprises calculating means denoted 54B adapted for calculating the theoretical rating $r_t$ dispatched to the operating unit 30 as a function of the calculated value V representative of the quantity of gas to be extracted. To perform the calculation, the calculating means 54B use the characteristic extraction curve of the fan.

According to yet another embodiment, the pressure sensor 58 and/or the temperature sensor 60 may be eliminated and the values of the pressure and of the temperature of the cryogenic fluid upstream of the valve 50 are then estimated by predetermined constant values.

What is claimed is:

1. Process for controlling the rate of gas extraction of a gas extractor for extracting gas from an enclosure of a cryogenic apparatus, said enclosure comprising a cryogenic fluid feed and an internal atmosphere, said apparatus being in contact with the outside atmosphere, comprising the steps of:

measuring the content ($m_{O2}$) of the internal atmosphere of the enclosure of a gas also found in the outside atmosphere;

defining a target content ($u_{O2}$) for said measured content;

calculating the rate of gas extraction ($r_c$) of the extractor as a function of said measured content ($m_{O2}$) so as to maintain this content substantially equal to said target content ($u_{O2}$); and operating said extractor on the basis of said calculated rate of gas extraction ($r_c$).

2. Process according to claim 1, further comprising the steps of:

determining a value (α) representative of the quantity of cryogenic fluid introduced into the enclosure; and calculating the rate of gas extraction ($r_c$) as a function of the value (α) representative of the measured quantity of cryogenic fluid and of said measured content ($m_{O2}$) and of said target content ($u_{O2}$).

3. Process according to claim 2, wherein the step of calculating the rate of gas extraction ($r_c$) comprises the successive steps of:

first calculating a theoretical rate of gas extraction ($r_t$) of said extractor as a function of said value (α) representative of the quantity of cryogenic fluid introduced into the enclosure;

then correcting via a regulating loop said theoretical rate of gas extraction ($r_t$) calculated as a function of said measured content ($m_{O2}$) and of said target content ($u_{O2}$).

4. Process according to claim 3, further comprising the steps of:

measuring the temperature (T) of the gas in the enclosure upstream of the extractor;

calculating a representative value (V) of the quantity of gas to be extracted from the enclosure on the basis of the measured temperature (T) and of the value (α) representative of the quantity of cryogenic fluid introduced into the enclosure; and calculating said theoretical extraction rating ($r_t$) as a function of said representative value (V) of the quantity of gas to be extracted.

5. Process according to claim 3, in which the enclosure of the cryogenic apparatus is substantially at the pressure of the outside atmosphere, further comprising the steps of:

measuring the pressure (Pe) of the gas upstream of said cryogenic fluid feed;

calculating a representative value (V) of a quantity of gas to be extracted from the enclosure on the basis of the measured pressure (Pe) and of the value (α) representative of a quantity of cryogenic fluid introduced into the enclosure; and calculating said theoretical rate of gas extraction ($r_t$) as a function of said representative value (V) of the quantity of gas to be extracted.

6. Process according to claim 3, further comprising the steps of:

measuring the temperature (Te) of the gas upstream of said cryogenic fluid feed;

calculating a representative value (V) of the quantity of gas to be extracted from the enclosure on the basis of the measured temperature (Te) and of the value (α) representative of the quantity of cryogenic fluid introduced into the enclosures; and calculating said theoretical rate of gas extraction ($r_t$) as a function of said representative value (V) of the quantity of gas to be extracted.

7. Process according to claim 2, further comprising the step of introducing the cryogenic fluid into the apparatus through at least one valve and in that said value representative of the quantity of cryogenic fluid is the degree of opening (α) of the valve.

8. Process according to claim 1, wherein the outside atmosphere is atmospheric and said gas whose content is measured is oxygen.

9. Process according to claim 1, further comprising calculating the rate of gas extraction ($r_c$) by a regulator which automatically optimizes the regulating parameters by:

calculating and storing at various instants of a time period the absolute value of the deviation between the measured content ($m_{O2}$) and the target content ($u_{O2}$);

calculating the means (γ) of said absolute values of the deviations over said time period;

comparing said mean (γ) with a predetermined threshold value ($Y_0$); and triggering automatic optimization of the regulating parameters if said mean (γ) is greater than said predetermined threshold value ($γ_0$).

10. Cryogenic apparatus comprising a working enclosure including an atmosphere open to an outside atmosphere, a gas extractor with variable extraction rating, a cryogenic fluid feed for the enclosure a device which measures the content ($m_{O2}$) of the atmosphere of the enclosure of a gas which is also found in the outside atmosphere;

a device which defines a target content ($u_{O2}$) for said measured content;

a device which calculates the rate of gas extraction ($r_c$) of the extractor as a function of said measured content ($m_{O2}$) so as to maintain this content substantially equal to said target content ($U_{O2}$); and a device which operates said extractor on the basis of said calculated rate of gas extraction ($r_c$).

11. Cryogenic apparatus according to claim 10, further comprising:

a device which determines a value ($\alpha$) representative of the quantity of cryogenic fluid introduced into the enclosure; and a device which calculates the rate of gas extraction ($r_c$) as a function, on the one hand, of the value ($\alpha$) representative of the measured quantity of cryogenic fluid and, on the other hand, of said measured content ($m_{O2}$) and of said target content ($u_{O2}$).

12. Cryogenic apparatus according to claim 11, wherein said device for calculating the rate of gas extraction ($r_c$) comprises:

a device which first calculates a theoretical rate of gas extraction ($r_t$) of said extractor as a function of said value ($\alpha$) representative of the quantity of cryogenic fluid introduced into the enclosure;

a device for then correcting via a regulating loop said theoretical extraction rating ($r_t$) calculated as a function of said measured content ($m_{O2}$) and of said target content ($u_{O2}$).

13. Cryogenic apparatus according to claim 12, further comprising:

a device for measuring the temperature (T) of the gas in the enclosure upstream of the extractor;

a device for calculating a representative value (V) of the quantity of gas to be extracted from the enclosure on the basis of the measured temperature (Te) and of the value ($\alpha$) representative of the quantity of cryogenic fluid introduced into the enclosure; and a device for calculating said theoretical rate of gas extraction ($r_t$) as a function of said representative value (V) of the quantity of gas to be extracted.

14. Cryogenic apparatus according to claim 12, in which the enclosure of the cryogenic apparatus is substantially at the pressure of the outside atmosphere, and wherein said apparatus further comprises:

a device for measuring the pressure (Pe) of the gas upstream of said cryogenic fluid feed;

a device for calculating a representative value (V) of the quantity of gas to be extracted from the enclosure on the basis of the measured pressure (Pe) and of the value ($\alpha$) representative of the quantity of cryogenic fluid introduced into the enclosure; and a device for calculating said theoretical rate of gas extraction ($r_t$) as a function of said representative value (V) of the quantity of gas to be extracted.

15. Cryogenic apparatus according to claim 12, comprising:

a device for measuring the temperature (Te) of the gas upstream of said cryogenic fluid feed;

a device for calculating a representative value (V) of the quantity of gas to be extracted from the enclosure on the basis of the measured temperature (Te) and of the value ($\alpha$) representative of the quantity of cryogenic fluid introduced into the enclosure; and a device for calculating said theoretical extraction rating ($r_t$) as a function of said representative value (V) of the quantity of gas to be extracted.

16. Cryogenic apparatus according to claim 11, further comprising a valve for introducing cryogenic fluid into the apparatus, wherein said value representative of the quantity of cryogenic fluid is the degree of opening ($\alpha$) of the valve.

17. Cryogenic apparatus according to claim 10, wherein the outside atmosphere is atmospheric air and said gas whose content is measured is oxygen.

18. Cryogenic apparatus according to claim 10, further comprising a regulator for calculating the rate of gas extraction (rc), which regulator automatically optimizes the regulating parameters by:

calculating and storing at various instants of a time period the absolute value of the deviation between the measured content ($m_{O2}$) and the target content ($u_{O2}$);

calculating the mean ($\gamma$) of said absolute values of the deviations over said time period;

comparing said mean ($\gamma$) with a predetermined threshold value ($\gamma_0$); and triggering automatic optimization of the regulating parameters if said mean ($\gamma$) is greater than said predetermined threshold value ($\gamma_0$).

* * * * *